Feb. 20, 1940. H. P. FREAR Re. 21,359
SHIP CONSTRUCTION
Original Filed July 19, 1934 4 Sheets-Sheet 1
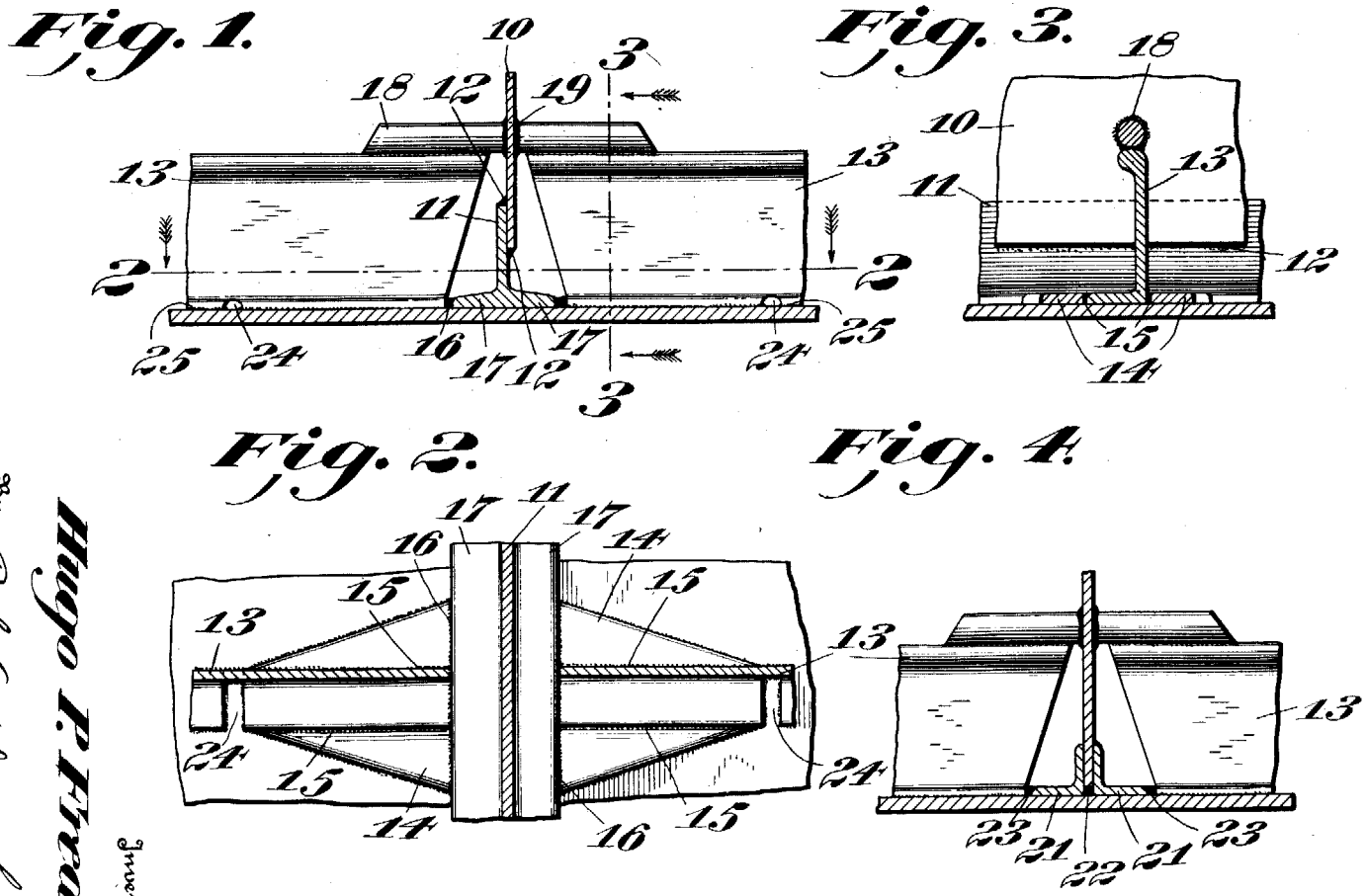
Inventor
Hugo P. Frear.
By R. S. C. Dougherty.
Attorney Feb. 20, 1940. H. P. FREAR Re. 21,359
SHIP CONSTRUCTION
Original Filed July 19, 1934 4 Sheets-Sheet 2
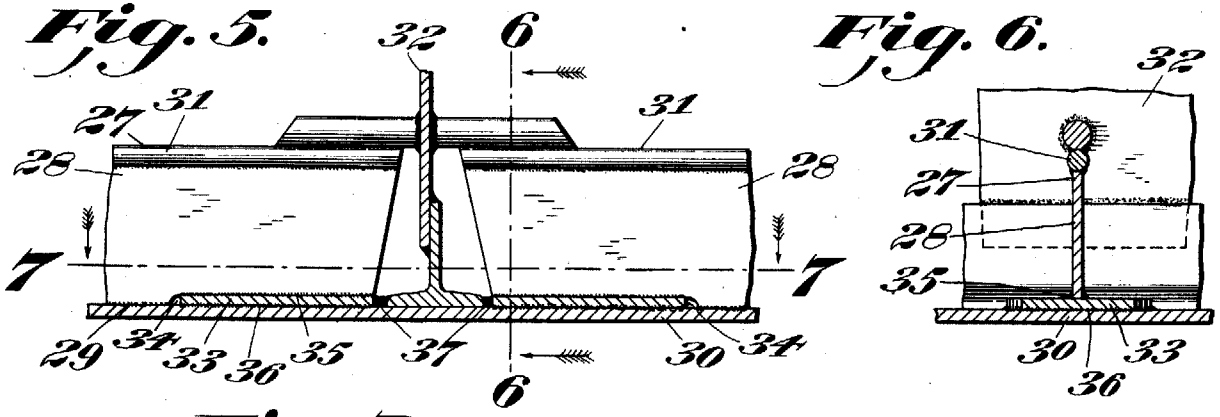
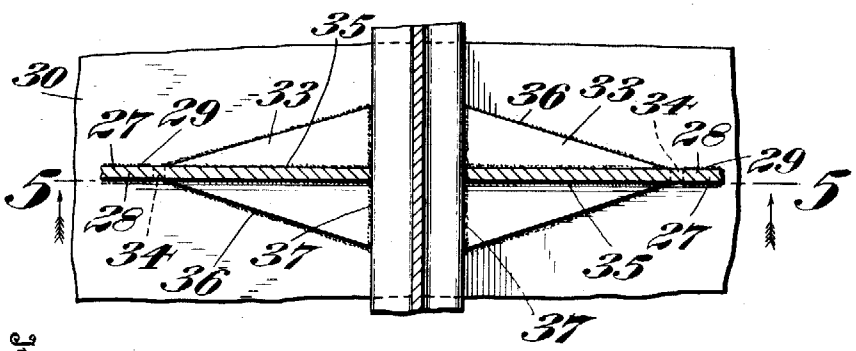
Inventor
Hugo P. Frear.
By R. S. C. Dougherty.
Attorney Feb. 20, 1940. H. P. FREAR Re. 21,359
SHIP CONSTRUCTION
Original Filed July 19, 1934 4 Sheets-Sheet 3
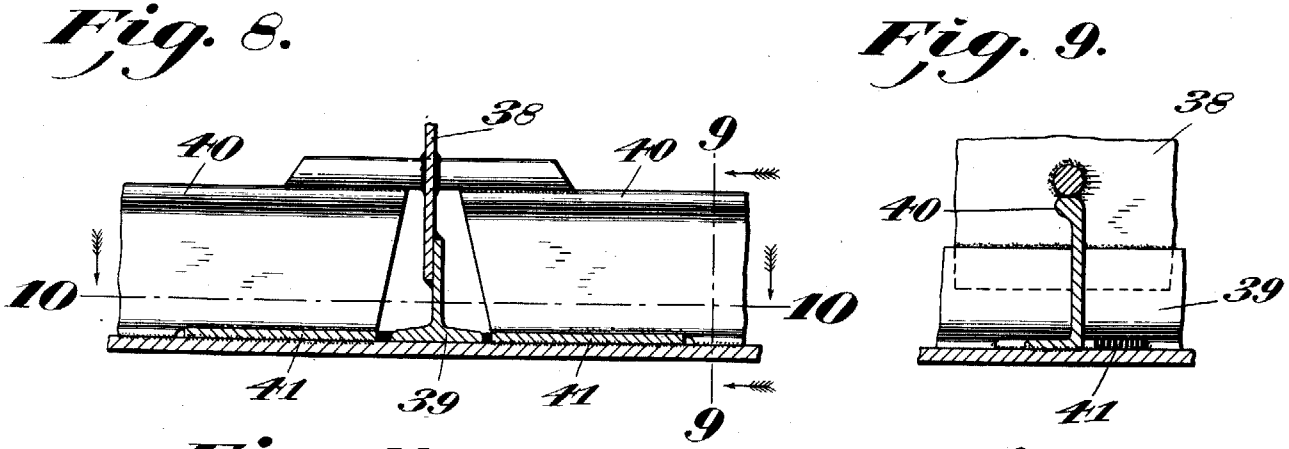
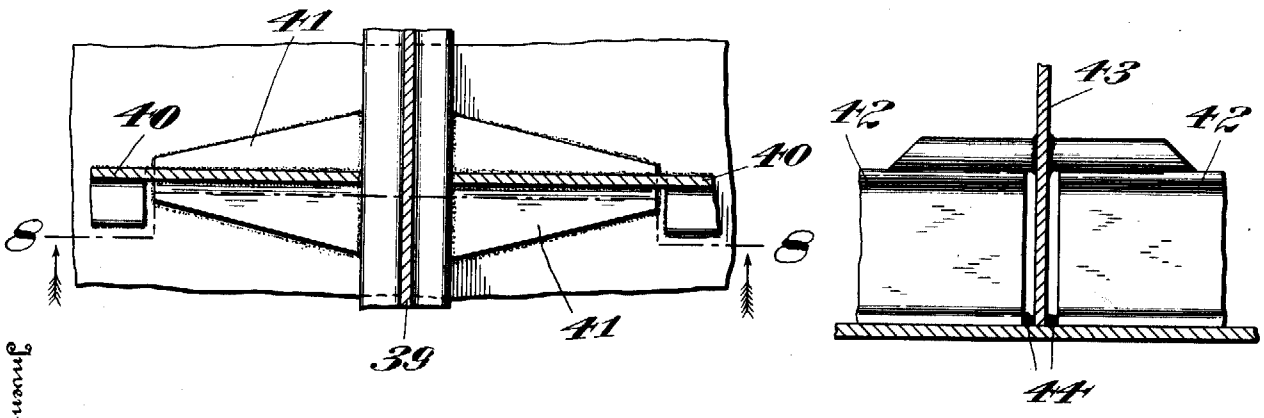
Inventor
Hugo P. Frear.
By R. S. C. Dougherty.
Attorney Feb. 20, 1940. H. P. FREAR Re. 21,359

SHIP CONSTRUCTION

Original Filed July 19, 1934 4 Sheets-Sheet 4

Inventor

Hugo P. Frear.

By R. S. C. Dougherty.

Attorney

Reissued Feb. 20, 1940 Re. 21,359

UNITED STATES PATENT OFFICE 21,359

SHIP CONSTRUCTION

Hugo P. Frear, New York, N. Y., assignor, by mesne assignments, to Bethlehem Steel Company, a corporation of Pennsylvania Original No. 2,103,715, dated December 28, 1937, Serial No. 59,211, January 15, 1936, which is a division of Serial No. 735,923, July 19, 1934. Application for reissue April 8, 1939, Serial No. 266,910

5 Claims. (Cl. 114—79)

This invention relates to improvements in the structure of floating vessels or ships of all types, but especially to vessels designed to carry liquid cargo in bulk, commonly called tankers, and built on the quasi longitudinal system of framing.

The present application is a re-issue application of my Patent No. 2,103,715, Serial No. 59,211, filed January 15, 1936, which was a continuation-in-part of my then co-pending application, Serial No. 688,574, filed September 8, 1933, which issued as Patent No. 2,053,903, and was a divisional application of my then co-pending application, Serial No. 735,923, filed July 19, 1934, which issued as Patent No. 2,053,904. In another application (Serial No. 59,212, Patent No. 2,071,925) filed concurrently with my application, Serial No. 59,211, I have disclosed and claimed broadly the feature of maintaining continuity of strength of longitudinals where cut by the bulkheads and this present application discloses and claims a specific form thereof.

The chief object of the present invention is to provide improved means for maintaining continuity of strength in the longitudinals of the ship's framing where cut by the bulkheads.

Another object of the present invention is to provide continuity of strength in the longitudinals of the ship's framing where cut by the bulkheads by welding additional metal to connect the ends of the longitudinals where cut by the bulkheads and to have this additional metal of a preferred shape as will hereinafter be described and set forth.

Another object of the present invention is to reduce to normal the unit stresses developed in the ship's plating at the line of the transverse bulkheads.

Another object of the present invention is to make a considerable saving in the weight of the framing of the ship over the usual framing with its initial saving in cost and future savings due to added capacity and reduced tolls.

With these objects in view, the present invention, broadly stated, resides in a ship or the like, particularly for carrying liquid cargo in bulk, in which longitudinal stiffeners are cut at a transverse bulkhead, and in which strength is restored to the stiffeners across the bulkhead at the outer portions of the stiffeners by plates having edges welded to the stiffeners and other edges welded to the bulkhead or to boundary bars associated therewith and at the inner portions of said stiffeners by a round bar extending watertight through the bulkhead by reason of being welded thereto and welded to the ends of the stiffeners.

By using a round bar at this point I have found that it combines with a high efficiency in increasing the section modulus a particular adaptability to its being welded to the longitudinals, by reason of the angles, formed when in contact with the longitudinals which angles are ideal for receiving the weld metal, and by reason of its convenient approach for welding. Furthermore the round section requires only the simplest form of piercing of the bulkhead plating—that of a round hole which may be formed either by means of the welding torch, or arc; or by the more conventional means of drilling or punching.

The novel features will be more fully understood from the following description and claims taken with the drawings, in which:

Fig. 1 is a partial section through a vessel illustrating one form of continuing the strength of longitudinals through the bulkheads;

Fig. 2 is a cross-section taken along the line 2—2 of Fig. 1;

Fig. 3 is a cross-section taken along the line 3—3 of Fig. 1;

Fig. 4 is a similar view to Fig. 1 illustrating a modification in the bulkhead;

Fig. 5 is a cross-section taken along the line 5—5 of Fig. 7;

Fig. 6 is a cross-section taken along the line 6—6 of Fig. 5;

Fig. 7 is a view taken on the line 7—7 of Fig. 5;

Fig. 8 is a cross-section taken along the line 8—8 of Fig. 10 illustrating a further modification;

Fig. 9 is a cross-section taken along the line 9—9 of Fig. 8;

Fig. 10 is a view taken on the line 10—10 of Fig. 8;

Fig. 14 is a modification of Fig. 4 and embodies my invention in its simplest form.

Figure 11:
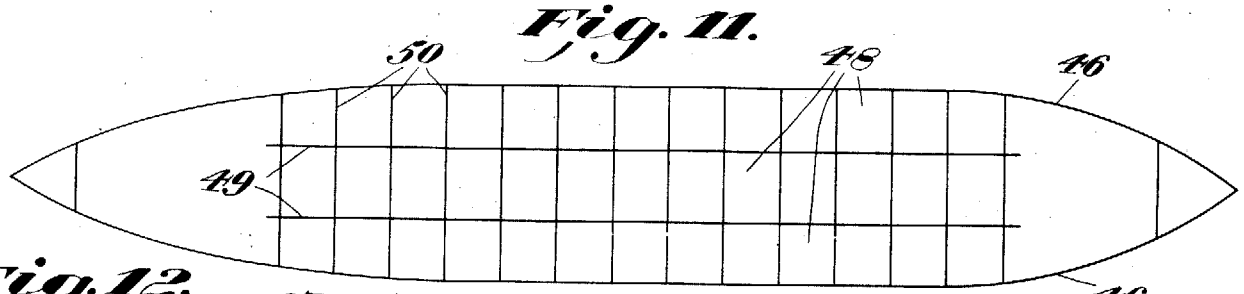
Fig. 11 is a diagrammatic layout of a hold plan of a vessel with transverse and longitudinal bulkheads adapted for longitudinal framing embodying my invention.

Referring now to Figures 1, 2, 3, 11, 12, and 13, the bulkhead plating 10 is shown suitably attached to the bulkhead boundary bar 11 as by welding 12. The longitudinal stiffeners 13 have their outer or plating flanges strengthened and extended in breadth on both sides and toward the ends by means of the flange extension plates 14 welded as at 15 to the stiffeners 13. As assembled in the finished vessel the extension plates 14 together with the cut ends of the stiffeners 13 are welded as at 16 to the plating flanges 17 of the boundary bar 11. Member 18 is preferably a round tie rod passing through the bulkhead plating 10 and welded or fused to the adjacent ends of the aligned longitudinal stiffeners 13. It is also welded watertight to the bulkhead plating 10 as at 19.

In Fig. 4 I show a modification to the design shown in Figs. 1, 2, and 3. In this modification the boundary bar comprises two angle bars 21 suitably attached to the bulkhead plating and has the heels of the bars 21 welded together as at 22, and the horizontal flanges of the bars 21 welded, as at 23, to the flanges of the stiffeners 13 in a manner similar to that shown in Figs. 1 and 2.

In case it is necessary to provide for drainage through the stiffeners, I may do so by means of the slots 24 in Figs. 1 and 2. The edges of the slots are securely welded to the ship's plating.

The stiffeners 13 are preferably continuously welded to the ship's plating as at 25.

The extension plates 14 may be increased or reduced or be limited to one side only of the stiffeners 13 as the exigencies of interference of plate or other circumstances in design demand.

By reason of the flange extension plates 14 being welded to the stiffeners 13, and both in turn welded to the boundary bar 11, the continuity of strength at the outer flange of the stiffeners 13 is maintained; and by reason of the tie rod 18 welded or fused to the inner flanges of the stiffeners 13 the continuity of strength at the inner flange is maintained. Furthermore by proper proportioning of the extension plates 14 and the tie rod 18 the continuity of strength in the stiffener through the bulkhead both longitudinally and as a beam may be maintained. The pull of the aligned stiffeners 13 is carried through the bulkhead without cutting the boundary bar 11 or the passing of doublings under the bar, thereby avoiding the objection of increasing the number of plies for riveting and the difficulty of making and keeping tight. The flanges 17 of the boundary bar 11 is neutral as far as performing any longitudinal work on the plating goes, so that the effect of joining the aligned longitudinal stiffeners 13, as described, is to restore the plating to exactly the same condition it would have been in if the stiffeners had not been cut. Furthermore, as broadly disclosed and claimed in my application (Serial No. 59,212, Patent No. 2,071,925) filed concurrently with my application (Serial No. 59,211, Patent No. 2,103,715), the latter being the original application of the present re-issue application, by the proper proportioning of the extension plates 14 and the tie rod 18 I am able to make a considerable saving in weight of longitudinals over prior practice. I make this saving, as described in said application, by so proportioning the extension plates 14 and the tie rod 18 that the section modulus thereof adjacent the bulkhead plating shall not be less than the sectional modulus of the stiffeners 13 in way of the web members 26. The sectional area of the tie rod 18 and the area of the plating between two adjacent stiffener ends is solely used in calculating the sectional modulus. The length of tie rod 18 on either side of the bulkheads along the stiffeners 13, as disclosed in the aforesaid application, is such that it is not short of the point nearest the bulkhead in the stiffeners 13 where the bending moment of said stiffeners is not less than the bending moment midway between the bulkheads and the nearest web member, or for a distance preferably not beyond the point of inflection nearest the bulkhead. The said two points being respectively approximately 10% and 21% of the distance from the bulkhead to the nearest web member. When thus properly calculated I am enabled to make my stiffeners 13 of the minimum section as determined by the stresses midway between the supports instead of, as has been the practice heretofore, having the section determined by the stresses at the supports. The saving in weight is readily seen to be an important feature of my invention.

In Figs. 5, 6, and 7 I show a modification to the design shown in Figs. 1, 2, and 3. In this modification the longitudinal stiffeners 27 comprise a web plate 28 continuously welded as at 29 along its outer edge to the ship's plating 30 and having welded along its inner edge the reenforcing bar 31. At the ends of stiffeners 27 where cut by the bulkheads 32 (similar to 10 of Fig. 1) the outer edge of the web plate 28 is coped out to accommodate the flange plate or bracket 33. The cope in the web plate 28 is allowed to extend beyond the end of the flange plate 33 to provide a drain opening 34. The flange plate 33 is welded to the web plate 28 as at 35 and is welded to the ship's plating 30 and to the bulkhead 32 as shown at 36 and 37 respectively.

In Figs. 8, 9, and 10 I show another modification to the design shown in Figs. 1, 2, and 3. The bulkhead 38 and the boundary bar 39 may be similar to that shown in Fig. 1. The longitudinal stiffeners 40 comprise an angle bulb beam. The stiffeners 40 are coped at the ends to accommodate the flange plates 41 in a similar manner as that just described for the stiffeners 27.

In still another modification, shown in Fig. 14, it is obvious that one or both of the boundary bars 21 of Fig. 4 could be dispensed with and in such cases the longitudinal stiffeners 42 would be welded directly to the bulkhead 43 by the weld metal 44.

Figure 13:
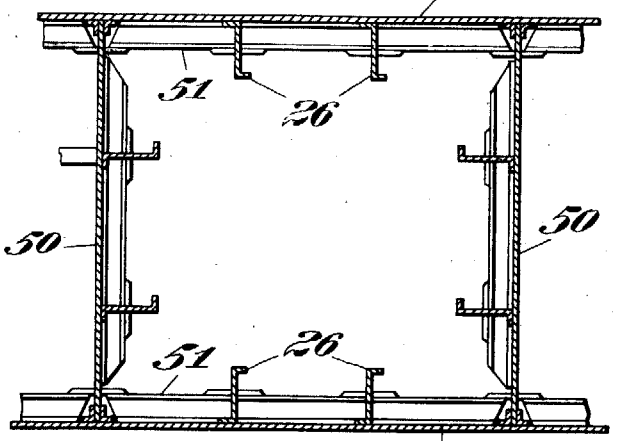
Fig. 13 is a longitudinal section taken horizontally through a portion of the vessel of Fig. 11 and illustrates the embodiment of my invention to the ship's longitudinals.
Figure 12:
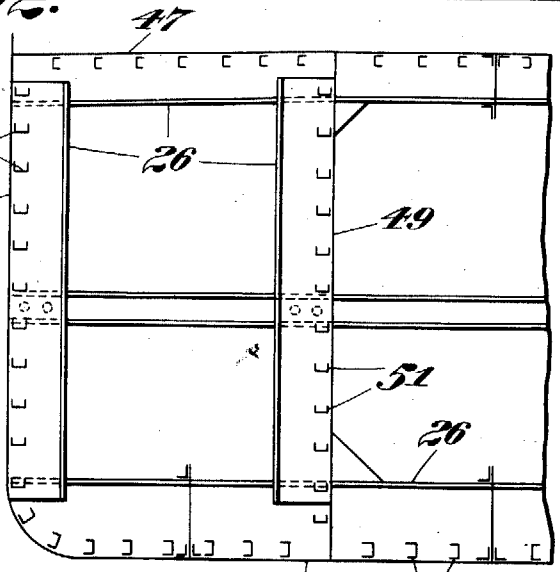
Fig. 12 is an enlarged cross-section in part taken on the line 12—12 of Fig. 11 and illustrates the longitudinal framing.

In Fig. 11 I have shown diagrammatically a hold plan of a type of vessel particularly adapted for embodying my invention. The vessel would be constructed with plating on the bottom 45, sides 46, and deck 47, on the quasi longitudinal system of framing, especially designed to carry a liquid cargo in bulk. It would comprise a plurality of tanks 48 formed by longitudinal bulkheads 49 and closely spaced transverse bulkheads 50 attached to the ship's plating 46 and to the longitudinal bulkheads 49. The transverse bulkheads 50 would comprise the plating 10 and the boundary bars 11 of Fig. 1. Referring now to Figs. 12 and 13, the framing of the vessel would comprise relatively deep and widely spaced transverse webs 26 attached to the ship's plating and to the longitudinal bulkheads. The framing would also comprise relatively narrow and closely spaced longitudinal stiffeners 51. The said stiffeners 51 would comprise the members 13 of Fig. 1 or its hereinbefore described modification.

The terms and expressions which I have herein employed are used as terms of description and not of limitation, and I have no intention, in the use of such terms and expressions, of excluding any equivalents of the features thereof, but recognize that various modifications are possible within the scope of the invention claimed.

Having thus described my invention what I claim as new and desire to secure by Letters Patent is:

1. In a vessel of quasi longitudinal construction, transverse bulkheads, fore-and-aft walls, water-tight means attaching the peripheral edges of said bulkheads to said walls, longitudinal stiffeners comprising inner and outer flanges cut through by said bulkheads in such a manner that the cut ends are in proximity to but in spaced relation to said bulkheads on each side thereof, said outer flanges being attached to their adjacent one of said walls and at said cut ends being welded to their adjacent one of said means, and round tie rods piercing said bulkheads and welded water-tight and completely around its periphery to said bulkheads and welded to said inner flanges of adjacent cut ends of said stiffeners.

2. In a vessel of quasi longitudinal construction, transverse bulkheads, fore-and-aft walls, water-tight means attaching the peripheral edges of said bulkheads to said walls, longitudinal stiffeners comprising inner and outer flanges cut through by said bulkheads in such a manner that the cut ends are in proximity to but in spaced relation to said bulkheads on each side thereof, and round tie rods piercing said bulkheads and welded water-tight and completely around its periphery to said bulkheads and welded to said inner flanges of adjacent cut ends of said stiffeners.

3. In a vessel, a plate member, a stiffener comprising an inner chord member cut through by said plate member in such a manner that the cut inner chord member is in proximity to but in spaced relation to said plate member on each side thereof, and a round tie rod piercing said plate member and welded water-tight to said plate member and welded to the cut ends of said inner chord member.

4. In a vessel, a plate member, a stiffener comprising inner and outer chord members cut through by said bulkhead in such a manner that the cut inner chord member is in proximity to but in spaced relation to said plate member on each side thereof, and a round tie rod piercing said plate member and welded water-tight to said plate member and welded to said inner chord members of the cut ends of said stiffener.

5. In a vessel, a bulkhead, fore and aft walls, water-tight means attaching the peripheral edges of said bulkhead to said walls, a stiffener comprising inner and outer chord portions cut through by said bulkhead in such manner that the cut ends of said chords are in proximity to but in spaced relation to said bulkhead on each side thereof, said cut outer chord portions being attached to their adjacent one of said walls and at said cut ends being welded to their adjacent one of said means, and a round tie rod piercing said bulkhead and welded water-tight around its periphery to said bulkhead and welded to said inner chord portions of the cut ends of said stiffener.

HUGO P. FREAR.